United States Patent [19]

Keaton

[11] Patent Number: 4,824,354
[45] Date of Patent: Apr. 25, 1989

[54] HYDRAULIC CONTINUOUS PRESS WITH IMPROVED DRIVE

[76] Inventor: Clyde D. Keaton, 48 Dickenson St., Woodstown, N.J. 08098

[21] Appl. No.: 156,323

[22] Filed: Feb. 16, 1988

[51] Int. Cl.⁴ .............................................. B28B 5/00
[52] U.S. Cl. ............................. 425/345; 100/93 RP; 100/151; 156/555; 156/583.5; 198/833; 198/859; 425/354; 425/371
[58] Field of Search .................. 100/93 RP, 144, 151, 100/154; 156/555, 583.5; 198/832, 833, 859; 425/345, 353, 354, 355, 371, 406, 407, 409

[56] References Cited

U.S. PATENT DOCUMENTS

| | | | |
|---|---|---|---|
| 1,326,231 | 12/1919 | Van Raalten | 100/154 |
| 2,071,999 | 2/1937 | Dike | 100/93 RP |
| 2,289,022 | 7/1942 | Maurer | 198/776 |
| 2,340,607 | 2/1944 | Maurer | 198/623 |
| 2,490,819 | 12/1949 | Lambert et al. | 156/300 |
| 3,577,304 | 5/1971 | Guyer | 100/151 |
| 3,680,476 | 8/1972 | Pfeiffer | 100/151 |
| 3,850,213 | 11/1974 | Keaton | 198/832 |
| 4,021,178 | 5/1977 | Braun | 425/371 |
| 4,299,552 | 11/1981 | Previati | 425/371 |
| 4,316,411 | 2/1982 | Keaton | 425/371 |

Primary Examiner—Jay H. Woo
Assistant Examiner—C. Scott Bushey
Attorney, Agent, or Firm—Reising, Ethington, Barnard, Perry & Milton

[57] ABSTRACT

A continuous high pressure press especially adapted for molding thermosetting or thermoplastic sheet material comprises two tracks each carrying a plurality of molds which converge at the press input where sheet material is fed in. Each track is engaged by two groups of presser rails which alternately move forward while applying molding pressure and move in reverse while retracted. The pressure is applied to each rail by a hydraulic actuator acting through a pinion which meshes with a rack formed in the rail. The pinion is rotated by another hydraulic actuator carried by the piston rod of the first actuator.

8 Claims, 6 Drawing Sheets

HYDRAULIC CONTINUOUS PRESS WITH IMPROVED DRIVE

FIELD OF THE INVENTION

This invention relates to a hydraulically actuated continuous press and particularly to such a press for continuous plastic sheet molding.

BACKGROUND OF THE INVENTION

There are numerous industrial operations which could be efficiently performed by a continuous press capable of applying pressure continuously to a workpiece while the workpiece is conveyed through the press. Of special interest is such a press suitable for sheet molding industrial resins or plastic compounds. Of particular importance is the ability to maintain a consistent high pressure to a molded part while it is being moved through the press and to apply heat as well.

A continuous press adapted for industrial processes is set forth in my U.S. Pat. No. 3,850,213. That patent discloses a continuous press comprising upper and lower platens which support opposed sets of presser-conveyor rails by means of plural cams which are rotatably mounted on the platen. Each set of rails drives a caterpillar belt and a sheet belt which encircle the platen supporting the set of rails. The workpiece is interposed between the sheet belts. The rails in each set are divided into plural groups and the supporting cams impart orbital motion to the rails in a poly-phase arrangement, i.e., the motion of each group of rails is phase displaced from the motion of each other group of rails. The corresponding groups of rails in the two opposed sets are actuated synchronously and the workpiece is pressed and advanced first by one group of rails in each set, then by another group of rails in each set. While this arrangement is capable of providing uniformly distributed, high pressure over the workpiece and a desired feed rate, it relies upon mechanical actuation through the sliding friction of rotating cams.

Another continuous hydraulic press is set forth in my U.S. Pat. No. 4,316,411. That patent discloses a continuous press similar to that of U.S. Pat. No. 3,850,213 in that it uses the groups of rails stepping in a poly-phase order, and a caterpillar belt and a sheet belt. The drive arrangement is hydraulic, each group of rail having separate but coordinated drive systems with linear actuators for applying pressure to the rails and for moving the rails transversely in the direction of belt movement and then relieving the pressure and moving the rails in reverse. The pressure applying actuators moved through a small angle during the belt movement so that the applied force was not always in a direction normal to the belts.

Another type of continuous press known in the art utilizes a pair of oppositely rotating chains of platens which are spaced apart to receive a workpiece therebetween. The platens are aligned in the direction of movement and are driven continuously over guide rollers or sprockets. Pressure is applied by hydraulic means to compress the workpiece between the opposed platens and an anti-friction roller belt is provided on the back side of each chain of platens to provide a roller type bearing. Such apparatus is disclosed in the U.S. Pat. Nos. 2,071,999 and also in the 2,490,819.

Another continuous press utilizes two oppositely disposed sets of parallel bars with the bar of each set extending in the direction of travel of the workpiece through the press. The workpiece is compressed between a pair of bars, one from each set, during a forward stroke of the pair of bars and then is compressed between a second pair of bars, one from each set, during a forward stroke of the second pair of bars. The bars of the first pair are caused to separate and relieve pressure on the workpiece and to make a return stroke during the forward stroke of the second pair. Similarly, the second pair of bars makes a return stroke during the forward stroke of the first pair. Apparatus of this type is set forth in the U.S. Pat. No. 2,340,607 wherein the bars are driven in the forward stroke by friction drive rollers and are released by the rollers at a flat spot thereon for a return stroke under the influence of a retracting spring, Another continuous press of this type is disclosed in the U.S. Pat. No. 2,289,022 wherein selected bars from the upper and lower set of bars are moved toward each other for compressing the workpiece therebetween by means of a cam and follower arrangement and the same bars are moved in a forward and return stroke on a common carriage which is actuated by a separate cam and follower arrangement.

Another apparatus using the reciprocation bar arrangement is shown in the U.S. Pat. No. 3,577,304. In the apparatus of this patent, a pair of opposed lifter bars are spaced apart to accept the workpiece therebetween and are mounted upon oppositely rotating eccentrics. Upon each rotation of the eccentrics the lifter bars successively compress the workpiece therebetween and impart a forward motion to it; at the end of the forward stroke the lifter bars open and a pair of holding bars are closed thereagainst by spring pressure to maintain compression of the workpiece in a dwell-condition while the lifter bars make a return stroke.

Another type of continuous press utilizes sliding friction to obtain a large bearing area for support of the moving press members. In this type of apparatus a pair of endless belts are disposed opposite each other and each is mounted on suitable drive rollers. The portions of the endless belts which are disposed in opposition and which receive the workpiece therebetween are respectively backed by rigid plates which in turn are supported by hydraulic plungers. To reduce the sliding friction the sheet of material having a low coefficient of friction is interposed between the moving belts and the respective backing plates. A continuous press of this type is shown in the U.S. Pat. No. 3,680,476.

SUMMARY OF THE INVENTION

It is therefore an object of the invention to provide a continuous press which overcomes certain disadvantages of the prior art. In particular, it is an object of the invention to provide a continuous press which is well suited to plastic sheet molding.

The invention is carried out by a press for simultaneously pressing and conveying a workpiece from an input to an output, a set of rails comprising first and second groups of rails disposed side-by-side, a reaction member disposed opposite said groups of rails in spaced relation and adapted to accept a workpiece between said groups of rails and said member, and each group of rails having driving means for pressing and simultaneously advancing the workpiece during one period and releasing the workpiece and retracting the group of rails during an alternate period, whereby the two groups of rails alternately press and advance the workpiece, the improvement wherein the driving means comprises: at least one rack on each rail group, at least one pinion in meshing relationship with each rack, means for supporting each pinion for rotation, transverse actuating means for each rail group for advancing and retracting each respective supporting means relative to said reaction member for pressing and releasing the workpiece, longitudinal actuating means for each rail group for reversibly rotating each respective pinion for advancing and retracting said rail group relative to said output, and means for energizing the actuating means for one rail group for pressing and advancing while energizing the actuating means for the other rail group for releasing and retracting and vice versa.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE PREFERRED EMBODIMENT

Figure 1:
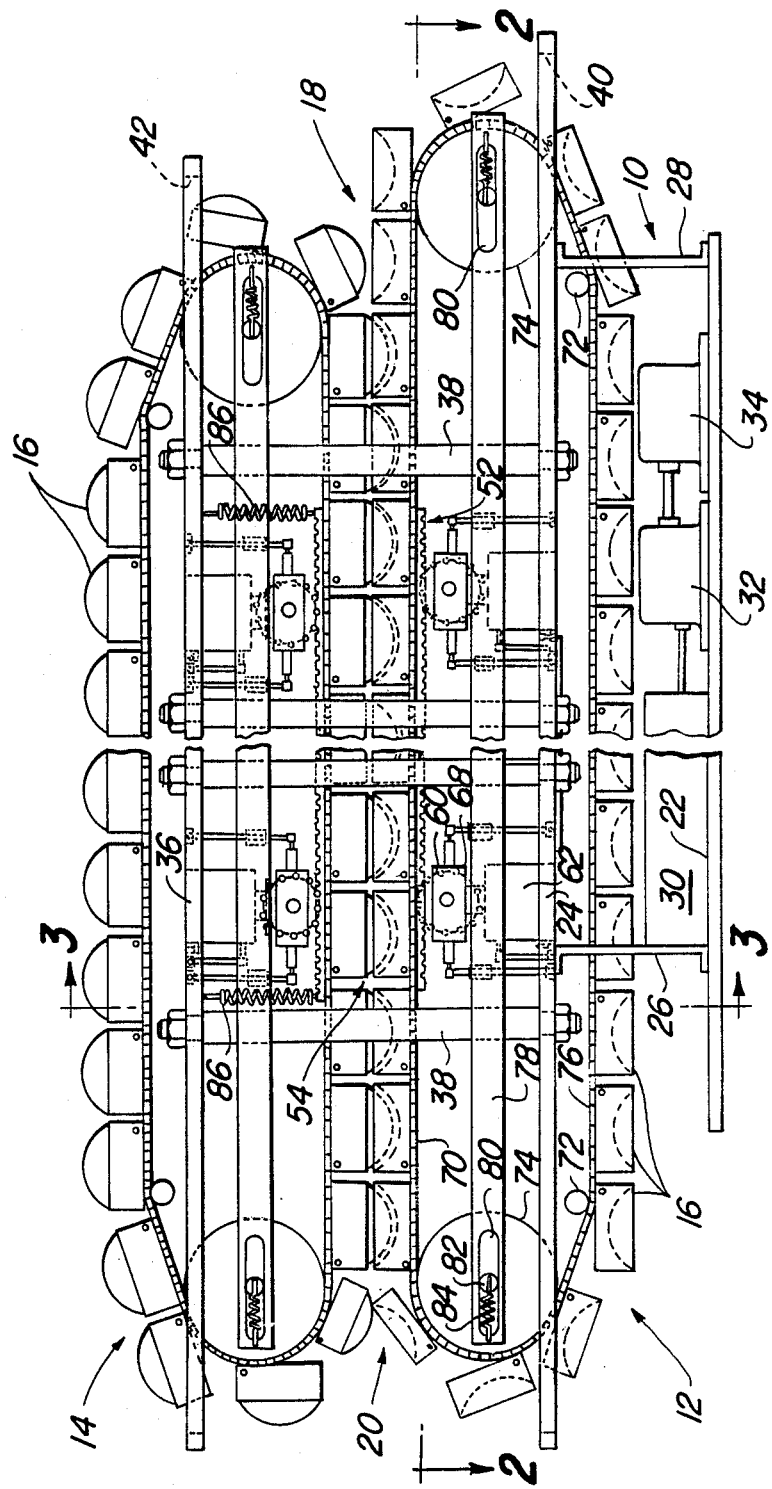
FIG. 1 is an elevation of a continuous press according to the invention.

Referring now to the drawings, there is shown an illustrative embodiment of the invention in a continuous press for simultaneously pressing and conveying a workpiece. It will be appreciated, as the description proceeds, that the invention may be employed in a wide variety of applications. The preferred application is continuous high pressure thermosetting or thermoplastic sheet molding and the description is specifically focussed on that.

As shown in FIG. 1, the continuous press comprises, in general, a stationary frame 10 which supports a lower press member 12 and a substantially identical upper press member 14. The press members 12 and 14 are disposed opposite each other and are adapted to carry a plurality of molds 16 which cooperatively receive plastic sheet material at an input 18 of the press and discharge molded parts at an output 20 of the press.

The frame 10 comprises a horizontal base plate 22 having a lower platen 24 mounted thereon by a pair of spaced headers 26 and 28. This arrangement provides a base compartment which suitably houses a fluid reservoir 30, a pump 32 and a motor 34 for the hydraulic system of the press. An upper platen 36 is fixedly mounted on the lower platen 24 by front and rear sets of columns 38, the front set being shown in FIG. 1 and the rear set being hidden but in the same arrangement as the front set. It is noted that the lower platen 24 is a flat steel plate having a rectangular opening 40 extending the full length and width thereof, for reasons which will appear subsequently. Similarly the upper platen 36 is provided with a rectangular opening 42.

Figure 2:
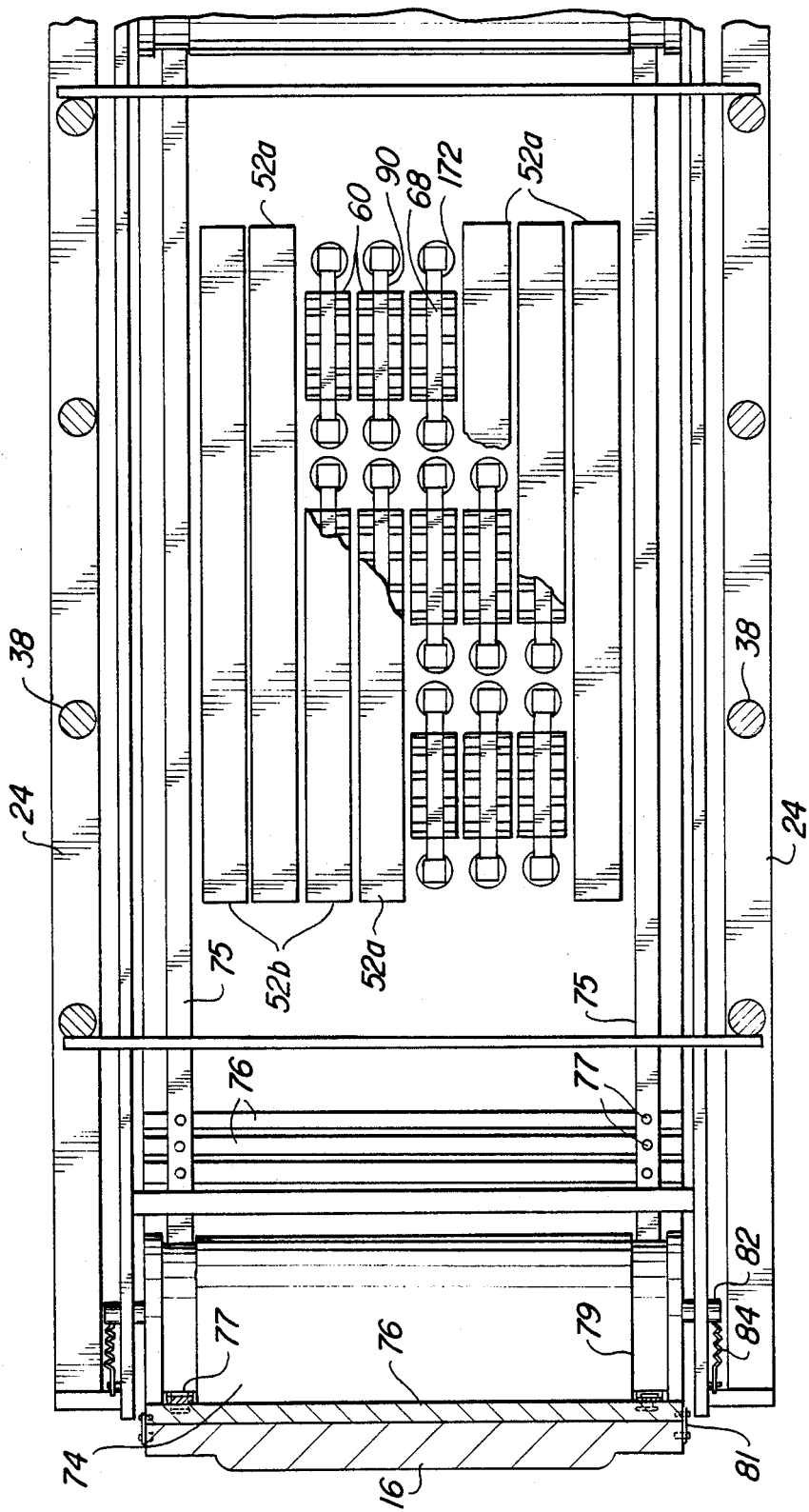
FIG. 2 is a partly broken away view taken on lines 2—2 of FIG. 1.
Figure 3:
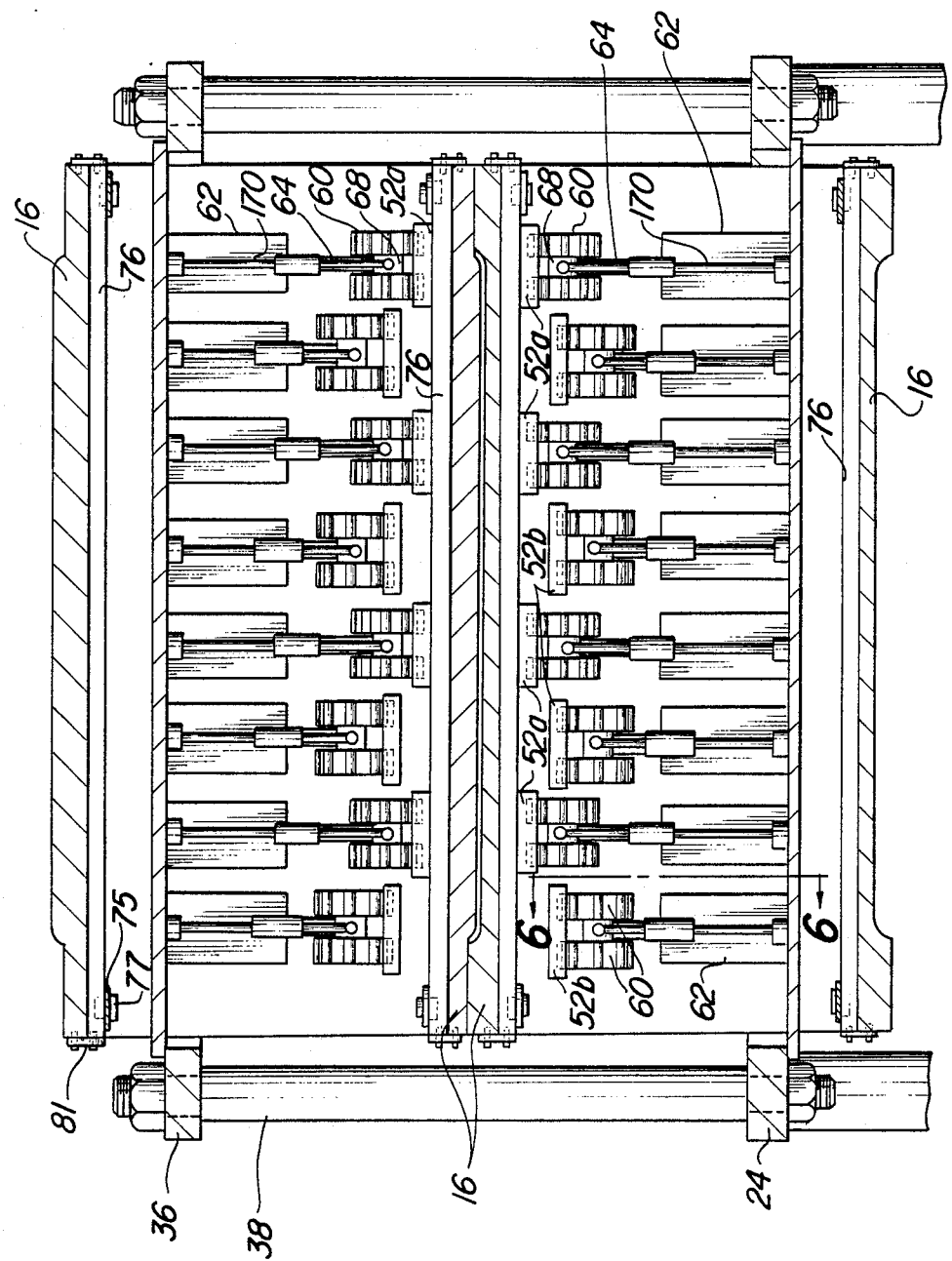
FIG. 3 is a view taken on lines 3—3 of FIG. 1.

As noted above, the lower and upper press members 12 and 14 are substantially identical to each other; therefore, only the lower press member will be described in detail. The lower press member comprises a first set of presser-conveyor rails 52, such rails being divided into two groups, 52a and 52b, disposed or interdigitated, as best shown in FIGS. 2 and 3. Each of the rails is rectangular in cross section and extends throughout the length of the throat 54 of the press. The rails are disposed parallel to each other in closely spaced relationship and are adapted for independent movement, as will be discussed subsequently. Each rail is suitably provided with fluid passages, not shown, to permit temperature control of the rails for heating or curing of the workpiece, as desired.

Each rail has a row of teeth 56 formed on its lower side to form a rack 58 integral with the rail 52. A plurality of pinions 60 engage each rack 58 and the pinions 60 are supported by hydraulic actuators 62 in the form of cylinders and pistons which operate piston rods 64. The piston rods 64 each engage a support member 66 at the hub of each pinion 60. A second set of hydraulic actuators 68 designed to impart rotary motion to the pinions 60 are incorporated into the support members 66 and are also carried by the piston rods 64. Thus each rail can be moved longitudinally in either direction by suitable energization of its rotary hydraulic actuators 68 for operation of its driving pinions 60 and it can be pressed toward the molds 16 or retracted by suitable energization of its associated hydraulic actuators 68.

Figure 8:
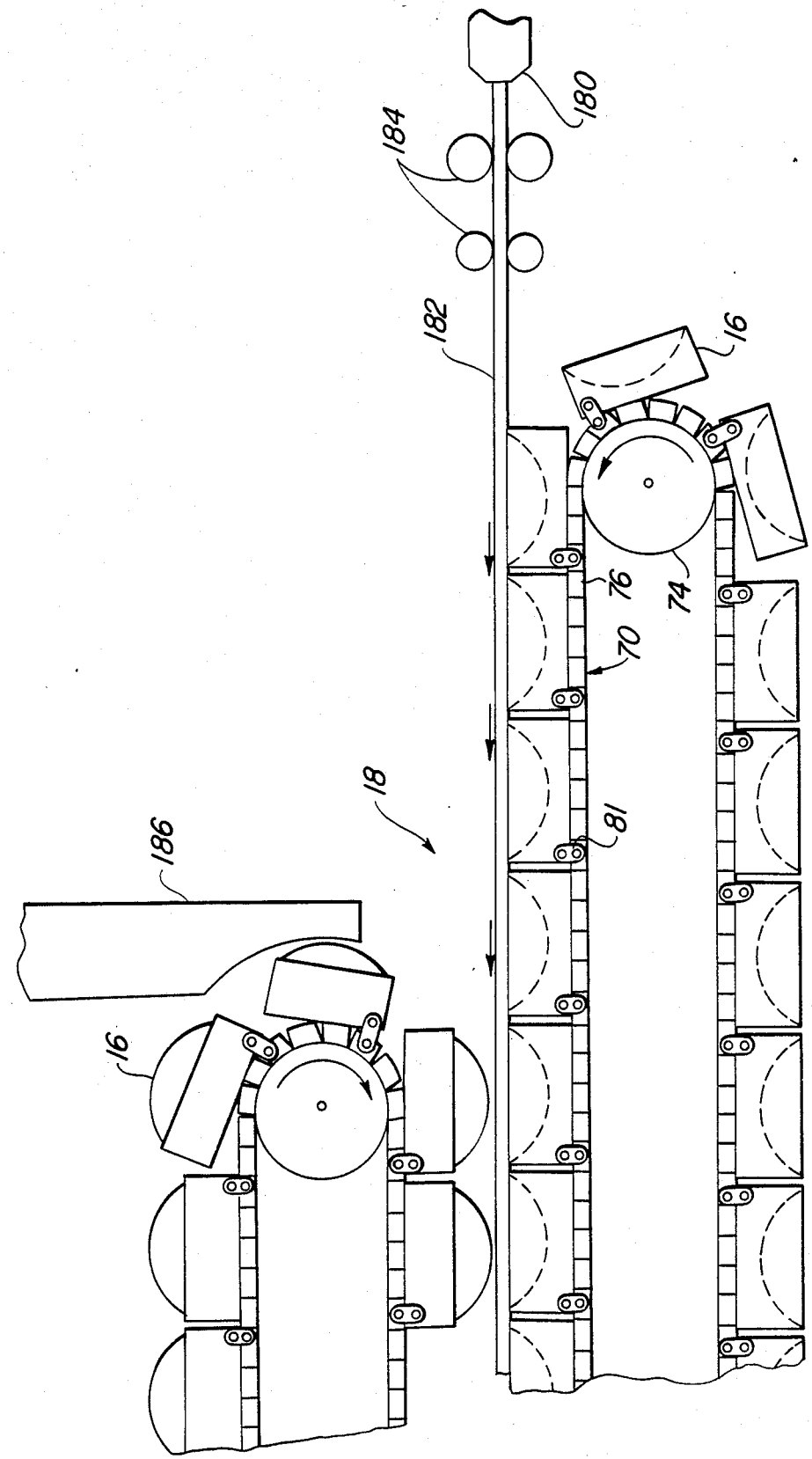
FIG. 8 is a schematic view of a portion of the apparatus of FIG. 1 showing a material feed operation.

In order to support the molds 16 for movement through the press and to transfer press force from the rails 52 to the molds, a track or belt 70 is interposed between the rails 52 and the molds 16. The track comprises an endless caterpillar belt 70 which encircles the set of rails 52 and is supported upon guide rollers 72 and a pair of end rollers 74. The caterpillar belt 70 comprises a pair of steel tapes 75 extending around the rollers 74 and a multiplicity of rigid bar links 76 attached by rivets 77 to the steel tapes 75 (FIG. 2). Each bar link 76 extends transversely of the press and spans the lower set of rails 52 in engagement therewith. The bar links 76 are disposed edge to edge. An annular groove 79 near each end of the rollers 74 receives the tapes 75 as they pass around the rollers. Each mold 16 is pivotally secured to a bar link 76 by hinges 81 as shown in FIG. 8. A pair of side bars 78 support the rollers 74. The side bars are provided with slots 80 to slidably receive shafts 82 of the rollers 74. Coil springs 84 attached between the shafts 82 and the side bars 78 urge the rollers away from each other to apply tension to the belt 70. It would appear from FIG. 1 that as the belt moves over the rollers at the output 20 of the press that interference may occur between the molds as they pivot away from the belt. The detail for avoiding this is not shown for the sake of simplicity, but comprises a gradual change of path of the upper and/or the lower belt 70 so that the pivoting action of the molds 16 is not abrupt.

To provide the simultaneous application of pressure to the molds 16 and the translation of the belt 70 and molds 16 through the press, a stepping action of the two groups of rails is used, such that as one group is in a driving mode the other is in a reverse mode. When the rail group 52a is pressed against the belt 70 to transfer high pressure to the molds 16 the pinions 60 for that group are rotated in the forward travel direction of the belt 70 thereby driving the belt and the molds toward the output 20. At the same time, the other rail group 52b is retracted slightly from the belt to permit reverse travel of those rails, and their pinions 60 are rotated in the reverse travel direction. When the rail group 52b reaches its limit position those rails are advanced into pressing and driving engagement with the belt 70. As the press load is taken up by the rail group 52b to enter its drive mode, the other group 52a starts to withdraw from the belt to begin its reverse mode.

While the upper press member 14 is of essentially the same construction as the press member 12 and is inverted to oppose the member 12 to provide the reaction to the force from member 12, one detail is changed in the upper member, however. To support the rails 52 in the upper member 14 when the pinions retract during the reverse mode, a coil spring 86 is stretched from each rail end to the upper platen 36. The springs need just enough tension to support the weight of the rails and hold them into contact with the pinions 60. While the springs 86 are generally vertical, they will move through a small angle as the rails traverse through their cycle.

Figure 4:
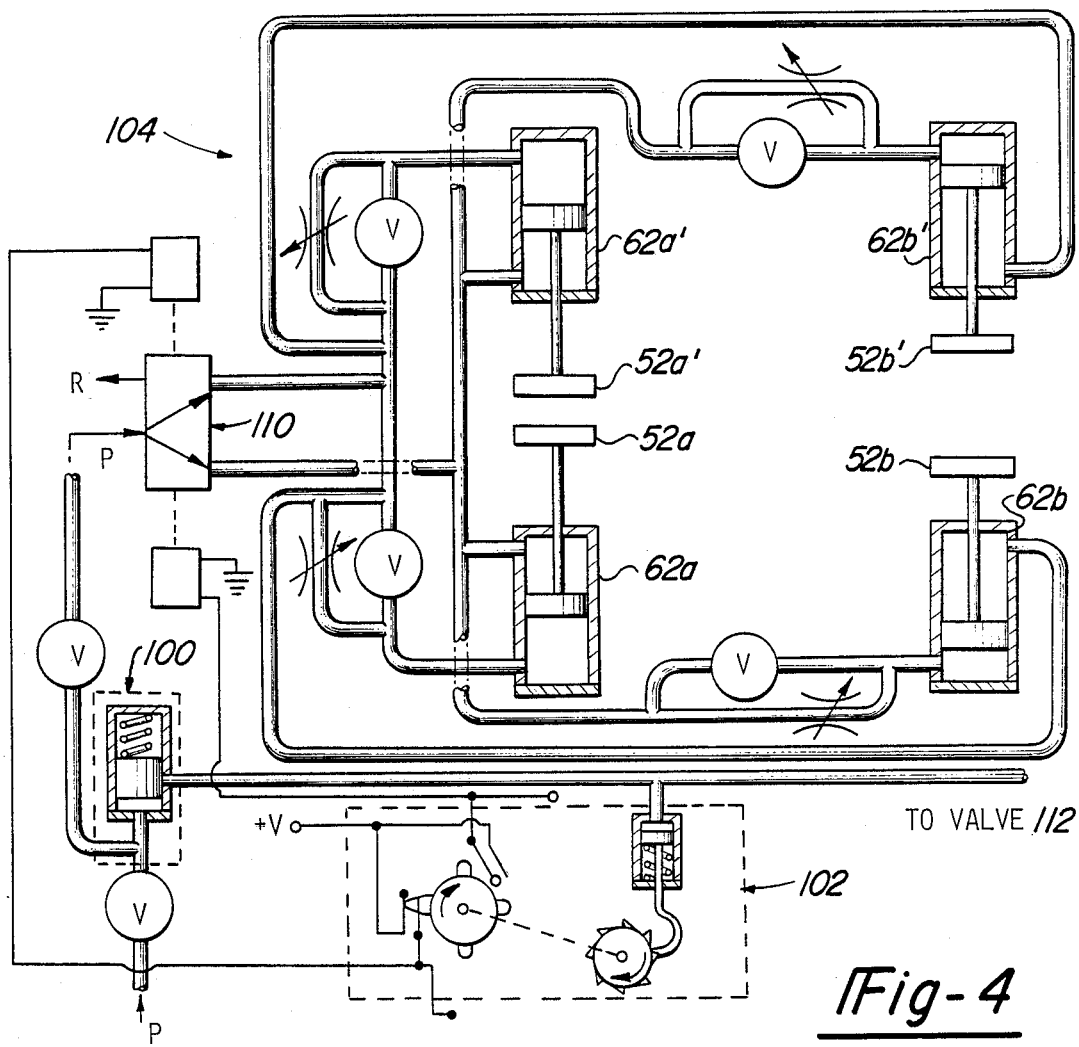
FIG. 4 and 5 are schematic diagrams of parts of the control system for the apparatus of FIG. 1.
Figure 5:
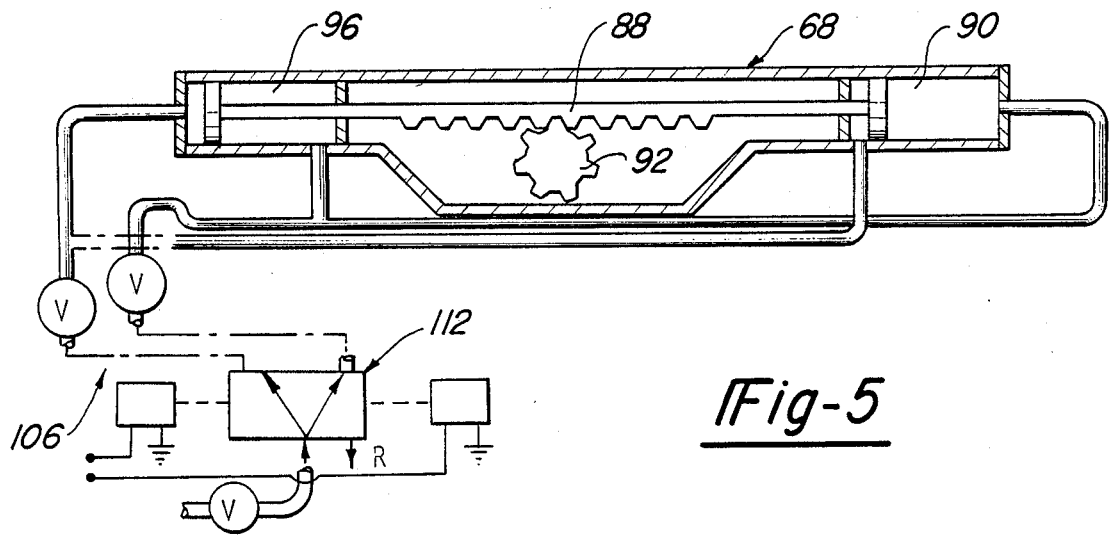

The control system for the continuous press is shown schematically in FIGS. 4 and 5, and is essentially the same as that disclosed in my patent U.S. Pat. No. 4,316,411 which is incorporated herein by reference. Reference to that patent and particularly to the disclosure relevant to the patent FIGS. 4 and 5 will provide details of the control construction and operation. One apparent difference is in the specific actuator 68 for longitudinal actuation, although the hydraulic control is the same. The actuator 68 comprises a rack 88 driven by a double acting piston and cylinder assembly 90 at each end. The rack 88 engages a pinion 92 which, in turn, is coupled to the drive pinion 60 to effect rotation thereof and longitudinal movement of the rail.

In general, the two groups of rails 52a and 52b in the lower member have counterparts in the upper member denoted by primed numerals. In the same way the actuators are divided into groups 62a and 62b and their upper counterparts 62a' and 62b'. The control system comprises a sequence valve 100 and a pressure responsive switch 102 which provide hydraulic pressure and control signals to a transverse control system 104 (FIG. 4) and to a longitudinal control system 106 (FIG. 5). The transverse control system comprises a reversing means including a solenoid valve 110 for the transverse actuators 62a etc. The longitudinal control system comprises a reversing means including a solenoid valve 112 for reversing the energization of the hydraulic actuator 68.

Figure 6:
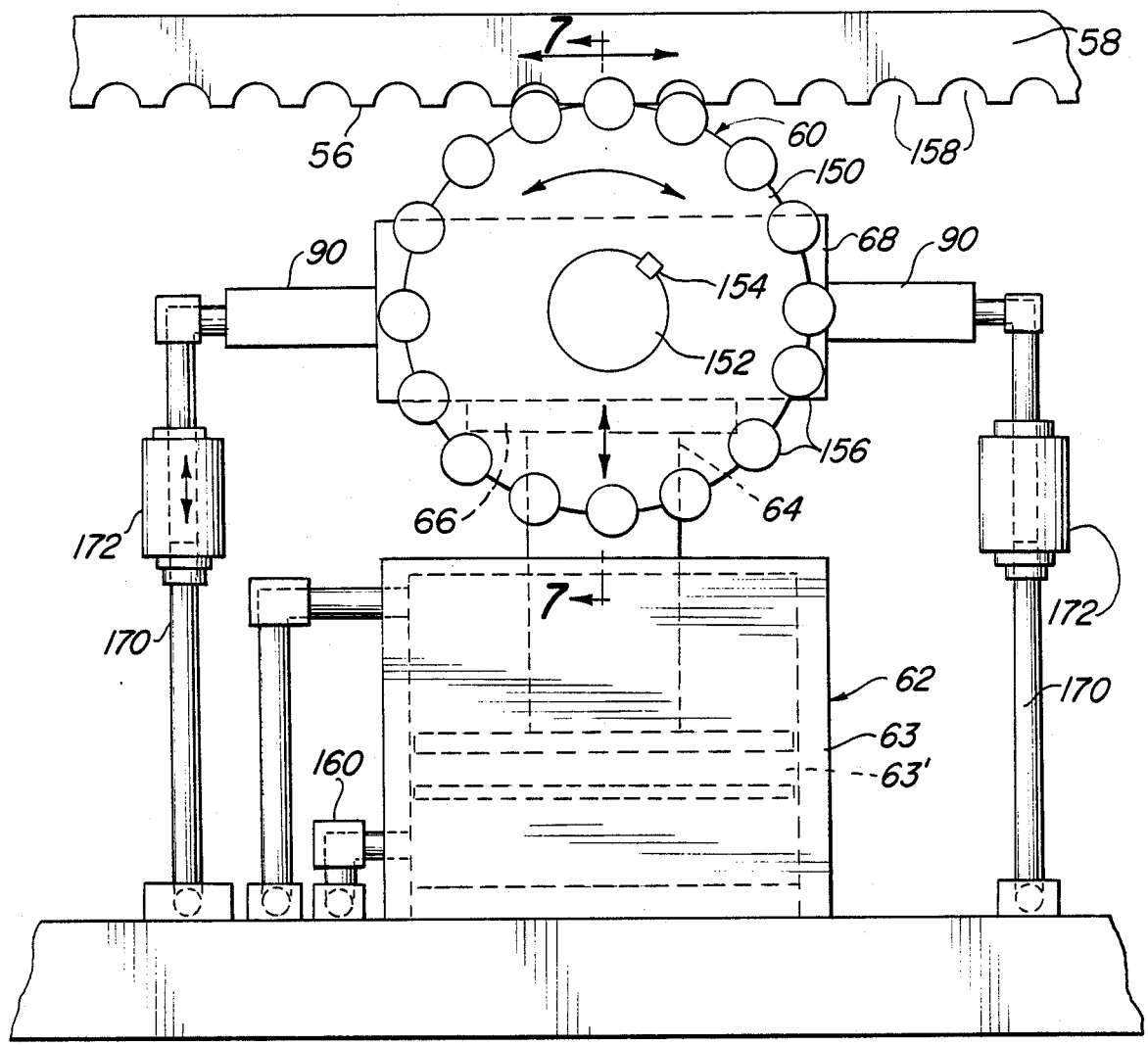
FIG. 6 is a view in elevation of a drive portion taken along lines 6—6 of FIG. 3.
Figure 7:
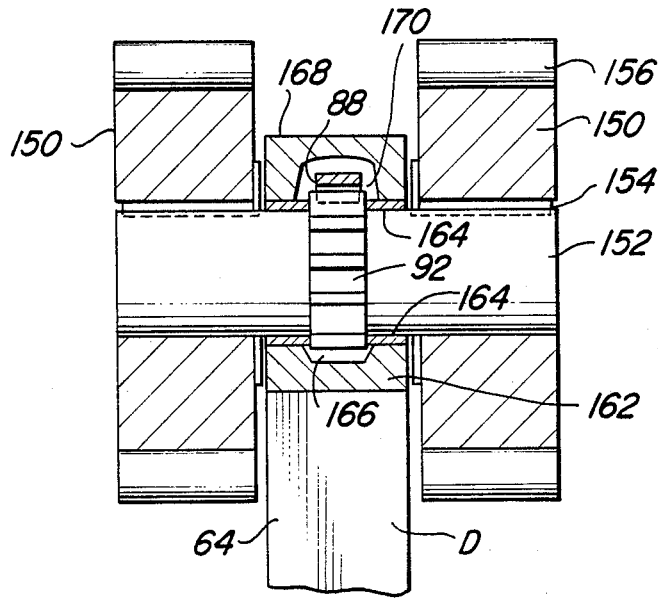
FIG. 7 is a cross-sectional view of the drive portion taken along lines 7—7 of FIG. 6.

The driving arrangement for the pinion 60 and the structure for applying pressure to the pinions 60 is shown in detail in FIGS. 6 and 7. The pinion 60 for each rail is a double pinion having two spaced wheels 150 mounted on a common shaft 152 and secured by keys 154. The teeth of the pinion are rods 156 welded to the wheel 150. The rack formed on each rail comprises semicylindrical recesses 158 matching the shape of the rods 156, thereby presenting a large surface area for transmitting the press force from the pinion to the rail. The transverse actuator 62 comprises a double acting hydraulic cylinder 63 and piston 63' with hydraulic fittings 160 supplying working pressure to the actuator. The piston rod 64 presses against a support member 162 which forms part of the housing for the longitudinal actuator 68. The support member 162 has a pair of wide area bearing surfaces lined with bearing material 164. A recess 166 between the bearing surfaces accommodates the pinion 92 which is integral with the shaft 152 and forms part of the actuator 68.

The actuator 68 has a housing part 168 which cooperates with the support member 162 to form a complete housing, and has a further recess 170 containing the rack 88 which drives the pinion 92. The cylinder assemblies 90 extend laterally from the pinion 92 and hydraulic lines 170 are coupled to the cylinder assemblies at each end of the translator 68. Slip couplings 172 in the hydraulic lines allow movement of the translator 68 as the pinion 60 moves toward and away from the molds 16. The rails need be retracted only a small amount, say one eighth inch, to free them for reverse movement. This has the advantage of easy slip coupling application as well as low power requirements for re-applying the high pressure actuator 62 to the molds.

FIG. 8 shows schematically the sheet plastic loading operation. An extruder 180 emits a sheet 182 of thermoplastic compound (or a roll pays out a sheet of thermosetting compound) which passes through rolls 184 for compacting. The sheet 182 feeds directly into the input end of the press. While the schematic drawing of FIG. 8 shows the molds in spaced relationship for clarity, they actually nest together so that the sheet 182 is captured between male and female molds 16 and pressed into the mold cavities. It can be seen that as the press advances the molds converge. A guide 186 assists the molds on the upper section to drop into place, in a controlled manner, against a mating mold. The molds are not necessarily all the same: different parts having similar characteristics can be made in adjacent molds. The molds must have the same thickness, however.

To cure the plastic during the press operation it may be required to apply heat to the molds. This is accomplished in a variety of ways. For example, gas burners in the press can heat the belt 70 which transfers heat to the molds. Heat can also be applied directly to the sheet 182 before it enters the molds. It is also possible to circulate steam or other hot fluids through the rails or the rollers 74.

It will thus be seen that in operation a continuous thermoplastic or thermosetting sheet is fed into the molds 16 carried on conveyor belts and that they are moved continuously through the press under high pressure. The high pressure is required to obtain a high quality surface finish on the resultant parts. The unique drive for the press comprises groups of rails in both the upper and lower section of the press which take turns in applying pressure while advancing toward the output of the press and retracting to recycle for another turn. The rails include an integral rack which is engaged by one or more drive pinions that transfer pressing force from a transverse hydraulic actuator in a direction normal to the belts. The pinions rotate under power from a longitudinal actuator carried by the transverse actuator to move the rails longitudinally. The timing of the rail movement in forward and reverse directions is coordinated by the hydraulic control to act in concert with the pressing and retracting modes of the rails, one group of rail acting in opposite phase to the other group.

The embodiments of the invention in which an exclusive property or privilege is claimed are defined as follows:

1. A press for simultaneously pressing and conveying a workpiece from an input to an output, a set of rails comprising first and second groups of rails disposed side-by-side, a reaction member disposed opposite said groups of rails in spaced relation and adapted to accept a workpiece between said groups of rails and said member, and each group of rails having driving means for pressing and simultaneously advancing the workpiece during one period and releasing the workpiece and retracting the group of rails during an alternate period, whereby the two groups of rails alternately press and advance the workpiece, the improvement wherein the driving means comprises:

at least one rack on each rail group, at least one pinion in meshing relationship with each rack, means for supporting each pinion for rotation, transverse actuating means for each rail group for advancing and retracting each respective supporting means relative to said reaction member for pressing and releasing the workpiece, longitudinal actuating means for each rail group for reversibly rotating each respective pinion for advancing and retracting said rail group relative to said output, and means for energizing the actuating means for one rail group for pressing and advancing while energizing the actuating means for the other rail group for releasing and retracting and vice versa.

2. The invention as defined in claim 1 wherein the transverse actuating means comprise hydraulic pistons and the longitudinal actuating means comprise rotary hydraulic motors.

3. The invention as defined in claim 1 wherein each rail has an integral rack.

4. The invention as defined in claim 3 wherein a pair of pinions mesh with each rack and wherein the supporting means carries a shaft, the pinions being laterally spaced and mounted on the shaft on either side of the supporting means, the longitudinal actuating means comprising a rotary hydraulic motor coupled to the shaft between the pinions, and the transverse actuating means comprising a hydraulic piston bearing against the supporting means to transfer pressing force through the shaft and pinions.

5. The invention as defined in claim 1 wherein the reaction member comprises a second set of groups of rails arranged to act in opposition to the said set of rails, the energizing means synchronously energizing corresponding groups of both sets of rails for cooperatively pressing and advancing the workpieces.

6. The invention as defined in claim 1 wherein the transverse actuating means comprise first hydraulic pistons and the longitudinal actuating means comprise second hydraulic pistons and auxiliary rack and pinion arrangements driven thereby to comprise rotary hydraulic motors.

7. A plastic sheet molding press comprising:

upper and lower conveyor sections which converge in and move through a molding zone, each section carrying a set of molds for cooperative engagement with the molds of the other section, means for merging plastic sheet material with the converging molds in the molding zone, and means for applying pressure to the molds to mold the sheet material and move the molds through the molding zone including;

first and second groups of rails, the rails of each group acting synchronously and bearing against both sets of molds, a plurality of racks on each group of rails, a pinion in meshing relationship with each rack, bearing means for supporting each pinion for rotation, a hydraulic piston for periodically pressing against each bearing means for alternately applying force through the pinion to the rails and retracting the rails, a hydraulic rotary actuator for reversibly rotating each respective pinion for advancing and retracting the respective rail relative to said mold movement, and means for energizing the pistons and actuators for each group of rails for simultaneously pressing and advancing the molds while energizing the actuators and pistons for the other group of rails for releasing and retracting, and vice versa.

8. The invention as defined in claim 7 wherein each conveyor section includes a flexible belt interposed between the rails and the molds, and the molds are attached to and carried by the belt.

* * * * *